United States Patent [19]
Bornhorst

[11] Patent Number: 6,007,249
[45] Date of Patent: Dec. 28, 1999

[54] STATIONARY OIL FILM BEARING FOR A FLYWHEEL ON A MECHANICAL PRESS

[75] Inventor: John B. Bornhorst, New Bremen, Ohio

[73] Assignee: The Minster Machine Company, Minster, Ohio

[21] Appl. No.: 08/977,422

[22] Filed: Nov. 24, 1997

[51] Int. Cl.$^6$ .................................................. F16C 17/02
[52] U.S. Cl. .............................................. 384/118; 384/906
[58] Field of Search ...................................... 384/906, 118, 384/119, 114, 111

[56] References Cited

U.S. PATENT DOCUMENTS

| | | |
|---|---|---|
| 3,337,275 | 8/1967 | Dschen . |
| 3,669,517 | 6/1972 | Hughes . |
| 4,090,743 | 5/1978 | Suzuki et al. . |
| 4,371,216 | 2/1983 | Suzuki et al. . |
| 4,772,137 | 9/1988 | Salter, Jr. et al. . |
| 5,403,098 | 4/1995 | Yasui et al. . |
| 5,556,207 | 9/1996 | Daniel . |

*Primary Examiner*—Lenard A. Footland
*Attorney, Agent, or Firm*—Randall J. Knuth

[57] ABSTRACT

A hydrodynamic oil film system is disclosed for developing a lubricant film between a flywheel and an associated stationary bearing during press machine operation. Hydrostatic bearing pads formed in the inner bearing surface of the stationary bearing are used to receive pressurized fluid. A hydrodynamic effect is produced during rotation of the flywheel enabling fluid transmitted into the hydrostatic bearing pads to be provided within the clearance between the flywheel and the stationary bearing. In another aspect, an oil film is produced between the keyed sections of the stationary bearing and an adjacent bearing support block to which the stationary bearing is interengaged for anti-rotational purposes, thereby preventing pounding out of the material from the key surfaces.

11 Claims, 1 Drawing Sheet

STATIONARY OIL FILM BEARING FOR A FLYWHEEL ON A MECHANICAL PRESS

BACKGROUND OF THE INVENTION

1. Field of the Invention.

The present invention generally relates to fluid bearings for supporting a rotary device, and, more particularly, to providing fluid support for a flywheel in a press machine and to developing fluid lubrication for an anti-rotationalkey.

2. Description of the Related Art.

Mechanical presses such as straight side presses and gap frame presses for stamping and drawing are provided with a frame structure having a crown and bed and a slide member supported within the frame for reciprocating motion relative to the bed. A crankshaft is provided to translate rotational motion generated by the press machine into reciprocal mechanical activity that is transmitted to the slide through a connecting arm. An upper die is mounted to the slide. The lower die is mounted to a bolster, which in turn is connected to the bed. Mechanical presses of this construction are widely used for blanking and drawing operations and vary substantially in size and available tonnage depending upon their intended use.

The primary source for stored mechanical energy and rotational actuation is the flywheel assembly, which in standard construction is located between the main drive motor and clutch. The flywheel and its associated bearing are mounted on either the driveshaft, crankshaft, or the press frame by use of a quill. The main drive motor replenishes the flywheel with rotational energy as the same becomes depleted from the flywheel during press stamping operations when the clutch couples the flywheel to the press driven parts and causes energy to be drawn away and transferred to other areas of the machine. In particular, during engagement of the clutch, the flywheel drops in speed as the press driven parts are thereby powered to reach press running speed. The flywheel rotates in unison with the clutch during operative engagement, whereas the flywheel bearings have no relative rotation except in configurations where a quill is used, in which case relative rotation is present.

The installation of flywheel assemblies into conventional machines such as mechanical presses makes use of anti-friction roller or ball bearings to mount the flywheel to its support. Bearings of this type feature low lubrication requirements, low viscous drag, and a statistically predictable lifetime. However, the bearings are susceptible to vibration and shock, which may cause brinelling, false brinelling, fretting corrosion, and consequential damage to the bearing races, hub bores and shaft.

Anti-rotational keys provide one form of mechanical coupling used in constructing and assembling the components of a press machine. This type of coupling between adjacent mechanical parts, for example, might employ a key element projecting from one part that is mated into a corresponding channel of another part defining a key receiving area. The registration of respective key elements inhibits relative rotation between the associated mechanical parts. However, due to the clearance that exists between the mated key elements, there will be unavoidable metal-to-metal contact. occurring during press operation that will continuously wear away material from both elements, which may eventually lead to unacceptable part displacements.

SUMMARY OF THE INVENTION

The invention comprises, in one form thereof, an apparatus for providing a hydrodynamic oil film system directed to the development of a lubricant film between a flywheel and an associated stationary bearing during press machine operation. Hydrostatic bearing pads formed in the inner bearing surface of the stationary bearing are used to receive pressurized fluid. A hydrodynamic effect is produced during rotation of the flywheel enabling fluid transmitted into the hydrostatic bearing pads to be provided within the clearance between the flywheel and the stationary bearing. In another aspect, an oil film is produced between the keyed sections of the stationary bearing and an adjacent bearing support block to which the stationary bearing is interengaged for anti-rotational purposes, thereby preventing pounding out of the material from the key surfaces.

The invention comprises, in another form thereof, a fluid bearing for use in supporting a flywheel assembly of a press machine. The fluid bearing includes a stationary bearing nonrotationally coupled to the press machine and having an inner bearing surface formed by a bore thereof and having an outer bearing surface facing the flywheel assembly disposed about the stationary bearing with a clearance therebetween and operative for relative rotation with respect to the stationary bearing during press machine operation. The stationary bearing includes at least one hydrostatic bearing pad formed in the inner bearing surface thereof. Supply means are provided for supplying pressurized fluid to the at least one hydrostatic bearing pad to enable the generation of a hydrodynamic effect during press machine operation sufficient to at least provide fluid in the clearance between the outer bearing surface of the stationary bearing and the flywheel assembly.

The at least one hydrostatic bearing pad comprises, in one form thereof, a plurality of discrete hydrostatic bearing pads disposed about the inner bearing surface of the stationary bearing.

The fluid bearing further comprises bearing support means for engaging the stationary bearing to inhibit rotation thereof and having a clearance with respect to the stationary bearing along an interface defined by the engagement. The bearing support means includes, in one form thereof, a bearing support block disposed in an axially juxtaposed relationship to the stationary bearing and including a receiving key defining a female portion formed in one section thereof facing the stationary bearing. The stationary bearing includes, in one form thereof, an extending key defining a male portion formed at one section thereof facing the bearing support block and operative for insertable registration within the receiving key of the bearing support block to define a key clearance therebetween. A means is included for providing fluid into the key clearance. The supply means includes, in one form thereof, a pump in fluid communication with the at least one hydrostatic bearing pad.

The invention comprises, in another form thereof, an apparatus for use in a press machine, comprising: a frame structure; a flywheel assembly including a flywheel rotatable relative to the frame structure; a driveshaft selectively connectable with the flywheel for driving rotation therewith; and flywheel bearing means for supporting the flywheel assembly. The flywheel bearing means comprises a stationary bearing nonrotationally coupled to the press machine and having an inner bearing surface formed by a bore thereof and having an outer bearing surface facing the flywheel assembly disposed about the stationary bearing with a clearance therebetween and operative for relative rotation with respect to the stationary bearing during press machine operation. The bearing includes at least one hydrostatic bearing pad defined in the inner bearing surface thereof and is supported by the drive shaft axially disposed within the bore thereof. A supply means is provided for supplying pressurized fluid to the at least one hydrostatic bearing pad to enable the formation of a hydrodynamic effect during press machine operation sufficient to at least introduce fluid into the clearance between the outer bearing surface of the stationary bearing and the flywheel assembly.

The invention comprises, in another form thereof, a press machine assembly comprising a flywheel assembly; a stationary bearing nonrotationally coupled to the press machine and having an inner bearing surface formed by a bore thereof and having an outer bearing surface facing the flywheel assembly disposed about the stationary bearing with a clearance therebetween and operative for relative rotation with respect to the stationary bearing during press machine operation; and bearing support means disposed in an axially juxtaposed relationship to the stationary bearing. An apparatus is further included comprising first key means formed in one section of the bearing support means facing the stationary bearing, and second key means formed in one section of the stationary bearing facing the bearing support means. The first key means and second key means are effective in cooperatively establishing an interengaging registration therebetween operative to inhibit rotation of the stationary bearing and to define a key clearance therebetween. A means is included for providing fluid into the key clearance to form a bearing lubricant therein.

The first key means includes a receiving key defining a female portion; and the second key means includes an extending key defining a male portion operative for insertable registration within the receiving key of the first key means.

The invention comprises, in yet another form thereof, a press machine assembly comprising a flywheel assembly; a stationary bearing nonrotationally coupled to the press machine and having an inner bearing surface formed by a bore thereof and having an outer bearing surface facing the flywheel assembly disposed about the stationary bearing with a clearance therebetween and operative for relative rotation with respect to the stationary bearing during press machine operation; a bearing support means disposed in an axial juxtaposed relationship to the stationary bearing; and a bearing apparatus including first key means formed in one section of the bearing support means facing the stationary bearing and second key means formed in one section of the stationary bearing facing the bearing support means, wherein the first key means and second key means are effective in establishing a coupling relationship therebetween. The improvement includes adapting the first key means and second key means to form a mutually engaging registration therebetween operative to inhibit rotation of the stationary bearing and to define a key clearance therebetween. A means is included to provide fluid into the key clearance to form a bearing lubricant therein.

One advantage of the present invention is that a load carrying pressure film is developed between a non-rotational stationary bearing and the flywheel during press machine operation.

Another advantage of the present invention is that a bearing lubricant is provided between the keyed sections of a keying arrangement provided to interengage the stationary bearing with a bearing support block, thereby preventing pounding out of the key material.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
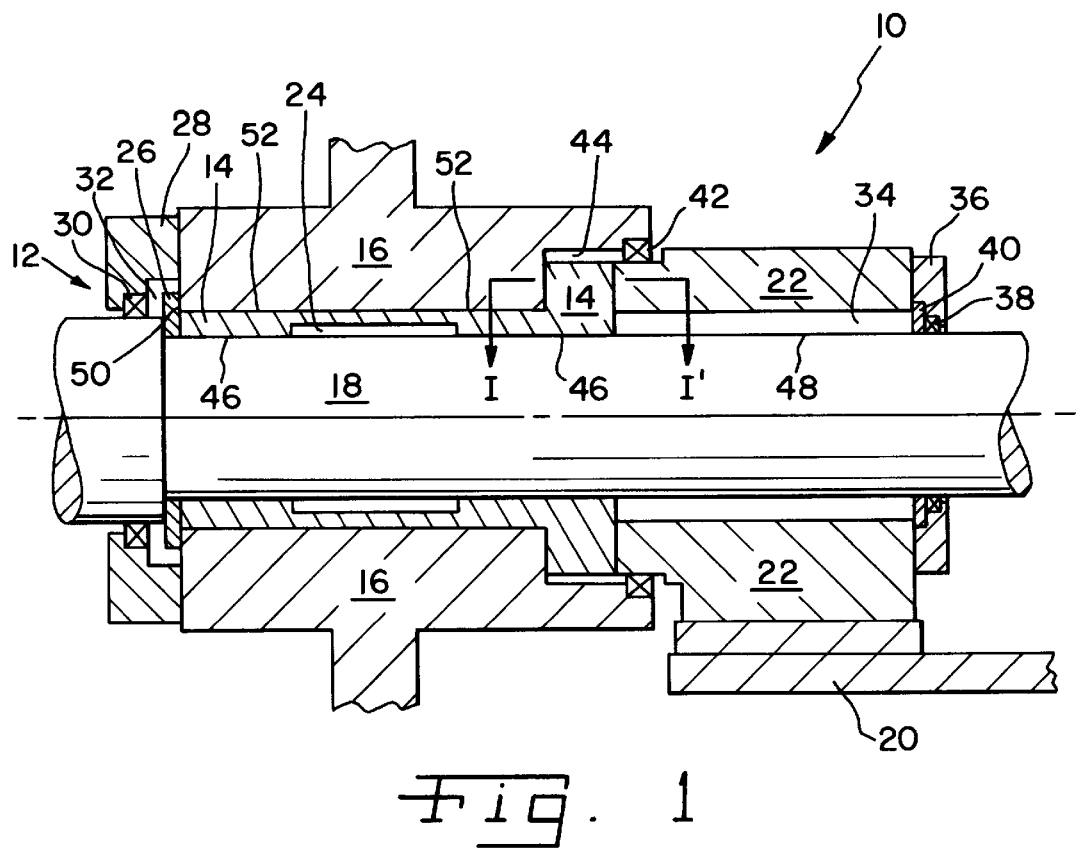
FIG. 1 is a longitudinal view taken in cross-section of a press machine apparatus to illustrate a bearing assembly for use with a flywheel, in accordance with one embodiment of the present invention.

Referring to FIG. 1, there is shown a longitudinal view taken in cross-section of a press machine assembly 10, disclosed in part, to illustrate bearing assembly 12 including stationary bearing 14 for use in supporting flywheel 16, according to one embodiment of the present invention. As will become more apparent hereinbelow, bearing assembly 12 facilitates the development of a hydrodynamic pressurized fluid film between stationary bearing 14 and flywheel 16 during an operational state when flywheel 16 is engaged for rotational motion. Stationary bearing 14 is non-rotaionally connected to the machine structure and therefore remains in a state of fixed orientation relative to the rotational activity of flywheel 16 and drive shaft 18. Bearing 14 may be equivalently considered herein as a quill structure known to those skilled in the art. Drive shaft 18 supports stationary bearing 14 and is axially disposed within the bore defined by the inner bearing surfaces of bearing 14. As discussed further in connection with FIG. 2, this non-rotating feature associated with bearing 14 is provided by means of a keyed inter-engagement between stationary bearing 14 and bearing support block 22, which is mounted to the top of crown 20.

The configuration of components represented by press machine assembly 10 preferably forms part of a fully assembled mechanical press unit (omitted herein for purposes of clarity) having a construction known to those skilled in the art. The mechanical press would include, for example, a frame structure having crown portion 20 and a bed portion with a bolster assembly connected thereto; uprights connecting crown portion 20 with the bed portion; a crankshaft; and a slide member positioned between the uprights and operatively engaged by the crankshaft for inducing reciprocating movement thereof. Connecting rods provide the coupling between the crankshaft and slide, enabling rotational energy of the crankshaft to be translated into reciprocating motion of the slide. Flywheel 16 is connected to the crankshaft by a conventional clutch/brake combination. Drive shaft 18, which constitutes part of the drive mechanism, is coupled to flywheel 16 by means of a belt, for example. Drive shaft 18 is rotating at the same revolutions as flywheel 16 when the clutch becomes engaged during press machine operation. Further details of such a press machine assembly may be made with reference to U.S. Pat. No. 5,556,207, made a part hereof by incorporation herein and assigned to the same assignee as the instant application.

Referring specifically to FIG. 1, bearing assembly 12 functions in cooperation with suitable components discussed herein to provide fluid communication that is sufficient to establish a fluid film between stationary bearing 14 and flywheel 16. In accordance with one aspect of the present invention, stationary bearing 14 is provided with at least one hydrostatic bearing pad 24 formed as a recess in the inner bearing surface of bearing 14 and which is disposed to face in a radially inward direction towards the longitudinal axis of shaft 18. Bearing pad 24 may occupy a limited zone within a circumferential band about the inner bearing surface or it may define a continuous channel region extending annularly about the inner bearing surface. Alternatively, a plurality of discrete bearing pads 24 may be provided and arranged randomly, in a selected distribution pattern, or circumferentially in one or a plurality of axially-spaced rows. Oil is supplied to bearing pad 24 using a network of oil conduits (not shown) formed within support block 22 and stationary bearing 14. In a preferred embodiment, oil is used for lubrication between moving parts, although other liquids or fluids may be utilized in an equivalent manner. The oil conduits are connected to external oil lines coupled by a manifold to an oil reservoir. An hydraulic pump is used to pressurize the oil and transmit it through the network of oil supply lines to bearing pad 24. The aforecited U.S. Pat. No. 5,556,207 includes a description of a suitable configuration of oil lines applicable herein.

Referring to the illustrated press machine assembly 10, additional components are provided for integral combination with stationary bearing 14 and bearing support block 22. Bearing support block 22 is disposed in an axially juxtaposed relationship with respect to stationary bearing 14. As discussed below in connection with FIG. 2, a clearance is defined between these components. A thrust bearing 26 annularly disposed about shaft 18 prevents flywheel 16 from moving out on stationary bearing 14. Retainer 28 axially retains flywheel 16 onto stationary bearing 14 and holds seal 30 annularly disposed about shaft 18 in position. Seal 30 prevents oil collecting in the adjacent clearance area 32 due to leakage from bearing pad 24 from escaping out of the interior of machine assembly 10. Stationary bearing 14 is secured in its indicated bearing position by drive shaft bearing 34, which is supported by and forms a press fit with bearing support block 22. A retainer 36 is provided to retain bearing support block 22 in the proper axial orientation with respect to stationary bearing 14 and shaft bearing 34, and to hold seal 38 annularly disposed about shaft 18 in position. Seal 38 prevents oil collecting in the adjacent clearance area 40 from escaping. A seal 42 mounted in flywheel 16 acts to seal oil between flywheel 16 and support block 22 and thereby prevent oil collecting in clearance 44 from escaping.

During press machine operation when flywheel 16 rotates relative to stationary bearing 14, hydrodynamic influences cause oil transmitted into hydrostatic bearing pad 24 to flow in an axial direction along the inner bearing surface of stationary bearing 14 within the clearance defined between drive shaft 18 and bearing 14. This particular flow forms an oil film shown at 46 defined along the longitudinal dimension of bearing 14 and established on both sides of bearing pad 24. The pressurized oil continues to travel in an axial direction into the clearance defined between drive shaft 18 and drive shaft bearing 34, forming therein an oil film shown at 48. It was further observed that an oil film shown at 50 is developed between thrust bearing 26 and flywheel 16. The pressurized oil is preferably conveyed to hydrostatic bearing pad 24 using a network including at least one fluid passageway (not shown) that transports oil through support block 22 into stationary bearing 14.

The process of admitting pressurized fluid into hydrostatic bearing pad 24 is principally ordered towards the development of a hydrodynamic effect during press machine operation enabling an oil film to be formed within the clearance defined between flywheel 16 and an outer bearing surface of stationary bearing 14 disposed in opposition to flywheel 16. In particular, the delivery of oil to bearing pad 24 is sufficiently controlled so as to establish a hydrodynamic effect and accompanying fluid flow that results in the formation of an oil film shown at 52, which is preferably defined along the entire length of the juxtaposed opposition of flywheel 16 and bearing 14. Oil film 52 constitutes an effective bearing structure that in combination with stationary bearing 14 forms a hydrodynamic system that serves to stably support the rotation of flywheel 16. Flywheel 16 is prevented from coming off by stationary bearing 14 with oil film 52 between both parts. The incompressibility of the fluid and its delivery under pressure jointly operate to maintain an adequate separation between the non-rotating stationary bearing 14 and the rotational flywheel 16 throughout the press cycle, providing sufficient radial support to prevent contact between the devices.

The combined effect of providing hydrostatic bearing pads 24 and a sufficient quantity of liquid such as oil to generate full-film lubrication between flywheel 16 and stationary bearing 14 creates a hydrostatic/hydrodynamic bearing assembly 12 having a load supporting capability that increases with relative rotational speed between stationary bearing 14 and flywheel 16. Pressurized oil within hydrostatic bearing pad 24 increases the stiffness of the assembly to positively locate bearing pad 24 (and hence flywheel 16) about drive shaft 18. Maintaining the lubricating film 52 by admitting fluid in sufficient quantities at the proper pressure levels ensures that no metal-to-metal contact occurs, thereby eliminating wear. A high capacity pump such as a Parker H77AA2A Gear Pump guarantees that a large supply of oil is available for creating full-film conditions for the hydrodynamic effect between flywheel 16 and stationary bearing 14.

Recirculation of the fluid admitted into bearing assembly 12 may be made possible by configuring clearance areas 32, 40, 44 with respective outlet ports adapted for fluid communication with integrally formed drain grooves allowing fluid to be discharged from the outlet ports and delivered through the grooves into a collection tank. The collected fluid may then be pumped by the fluid pump back into the input channels coupled to the hydrostatic bearing pads. Although FIG. 1 illustrates the use of hydrostatic bearing pad 24 in order to effect a conveyance of fluid to the clearance region between flywheel 16 and stationary bearing 14, the present invention encompasses any means by which pressurized fluid is provided to this clearance region in a manner sufficient to establish a hydrodynamic bearing support involving a fluid film lubricant. For example, support block 22 and stationary bearing 14 may be appropriately machined so as to produce fluid passageways therein that provide direct fluid access to the clearance region, thereby avoiding the need for any hydrostatic bearing area.

Figure 2:
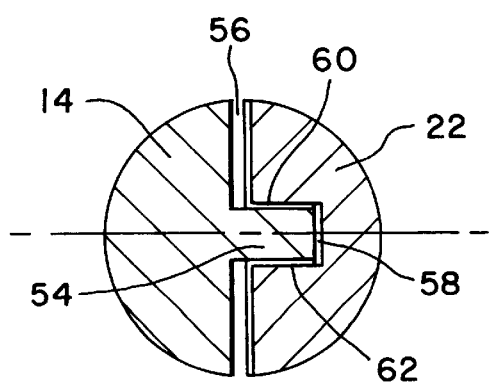
FIG. 2 is a cross-sectional view taken along lines II' in FIG. 1 to illustrate a fluid bearing for an anti-rotational key element, in accordance with another embodiment of the present invention.

Referring to FIG. 2, there is shown an enlarged cross-sectional view taken along lines I—I in FIG. 1 to illustrate a fluid bearing for an anti-rotational key element, in accordance with another embodiment of the present invention. As stated above, bearing 14 does not exhibit any motion activity but instead remains in a stationary position, particularly in relation to the rotational activity of flywheel 16. Accordingly, bearing 14 must be installed and secured in such a manner as to prevent any rotational motion thereof.

In accordance with one aspect of the present invention, a keying arrangement is provided to interengage stationary bearing 14 and adjacent support block 22 with a clearance therebetween, while advantageously permitting the introduction of fluid into the clearance to establish a fluid bearing between the respective surfaces of the individual key elements.

Stationary bearing 14 is provided with an extending key element 54 formed at a surface thereof abutting support block 22 and disposed to project in an axial direction. As noted above, support block 22 is fixedly secured within press assembly 10 by being mounted to crown 20. Furthermore, support block 22 includes a recess defining a female key portion having a channeled area with dimensions suitable for insertably and/or slidably receiving extending key 54 to form an interengagement therebetween that restricts bearing 14 from rotational motion. The interengagement also defines a key clearance 58 between the individual key structures. The extending key element 54 and corresponding recess channel are properly machined to accommodate their required alignment when bearing 14 and support block 22 are integrated together to form a secure, non-rotatable unit. Fluid such as oil is communicated into clearance 58 from the overlying clearance 44 defined between flywheel 16 and bearing 14 or by any other means capable of providing fluid to clearance 58.

The abutting relationship created by the keying arrangement is not defined by a press fit between the devices but rather involves a clearance 56 outside the keying area and a clearance 58 within the keying area between the terminal surface of extending key 54 and the trough surface of the recess channel. Oil is introduced into the clearances by a suitable piping arrangement to establish a fluid bearing between the individual key elements comprising oil film 60 and oil film 62 that serves as a lubricant for the associated mechanical components. Because clearance 58 constitutes a free and undamped clearance space, the limited axial and radial displacements permitted by this small clearance will produce vibratory motions of the key elements that operate in conventional machines to generate metal-to-metal contact that continuously pounds out the key clearance. However, as disclosed herein, the fluid bearing formed between the key elements when pressurized fluid is admitted into the clearance prevents such metal-to-metal contact and eliminates the potential pounding out of material on the sides of the keys, thereby preserving the integrity of the secured engagement between stationary bearing 14 and support block 22 and sustaining their relative non-rotation.

The individual key structures are formed using conventional machining technology. The illustrated key combination depicts a geometry involving a rectangularly-shaped element 54 slotted into a recess channel of compatible dimensions; however, the key elements may be configured in any number of geometries suitable for interengaging stationary bearing 14 and support block 22 to prevent rotation thereof. A mechanical coupling using purely mechanical structures is the preferred choice for constructing and integrating the keying devices because of their ease of installation, simplicity of design, and effectiveness. Additionally, the indicated male and female key elements corresponding respectively to extending key 54 and the channel recess area may be provided in an alternative configuration wherein support block 22 furnishes the male key element while stationary bearing 14 includes the female key element.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fluid bearing for use in supporting a flywheel assembly of a press machine, comprising:

a stationary bearing nonrotationally coupled to the press machine and having an inner bearing surface formed by a bore thereof and having an outer bearing surface facing the flywheel assembly disposed about said stationary bearing with a clearance therebetween and operative for relative rotation with respect to said stationary bearing during press machine operation, said stationary bearing including at least one hydrostatic bearing pad formed in the inner bearing surface thereof; and supply means for supplying pressurized fluid to said at least one hydrostatic bearing pad to enable the generation of a hydrodynamic effect during press machine operation sufficient to at least provide fluid in the clearance between the outer bearing surface of said stationary bearing and said flywheel assembly.

2. The fluid bearing as recited in claim 1, wherein said at least one hydrostatic bearing pad comprises:

a plurality of discrete hydrostatic bearing pads disposed about the inner bearing surface of said stationary bearing.

3. The fluid bearing as recited in claim 1, wherein the hydrodynamic effect generated during press machine operation provides fluid within a clearance defined between the inner bearing surface of said stationary bearing and a drive shaft axially disposed within the bore of said stationary bearing.

4. The fluid bearing as recited in claim 1, further comprises:

bearing support means for engaging said stationary bearing to inhibit rotation thereof and having a clearance with respect to said stationary bearing along an interface defined by said engagement.

5. The fluid bearing as recited in claim 4, wherein said bearing support means comprises:

a bearing support block disposed in an axially juxtaposed relationship to said stationary bearing and including a receiving key defining a female portion formed in one section thereof facing said stationary bearing; and wherein said stationary bearing includes an extending key defining a male portion formed at one section thereof facing said bearing support block and operative for insertable registration within the receiving key of said bearing support block to define a key clearance therebetween.

6. The fluid bearing as recited in claim 5, further comprises:

means for providing fluid into said key clearance.

7. The fluid bearing as recited in claim 1, wherein said supply means comprises:

a pump in fluid communication with said at least one hydrostatic bearing pad.

8. A fluid bearing for use in supporting a flywheel assembly of a press machine, comprising:

a stationary bearing nonrotationally coupled to the press machine and having an inner bearing surface formed by a bore thereof and having an outer bearing surface facing the flywheel assembly disposed about said stationary bearing with a clearance therebetween and operative for relative rotation with respect to said stationary bearing during press machine operation, said bearing including at least one hydrostatic bearing pad formed in the inner bearing surface thereof;

bearing support means disposed in an axial juxtaposed relationship to said stationary bearing and including a receiving key formed in one section thereof facing said stationary bearing;

said stationary bearing further including an extending key formed at one section thereof facing said bearing support means and adapted for insertable registration within the receiving key of said bearing support means to define a key clearance therebetween and inhibit rotation of said stationary bearing;

means for providing fluid into said key clearance to form a bearing lubricant therein; and supply means for supplying pressurized fluid to said at least one hydrostatic bearing pad to create a hydrodynamic effect during press machine operation sufficient to at least introduce fluid into the clearance between the outer bearing surface of said stationary bearing and said flywheel assembly.

9. The fluid bearing as recited in claim 8, wherein:

the extending key of said stationary bearing defines a male portion; and the receiving key of said bearing support means defines a female portion.

10. The fluid bearing as recited in claim 8, wherein said at least one hydrostatic bearing pad comprises:

a plurality of discrete hydrostatic bearing pads disposed about the inner bearing surface of said stationary bearing.

11. The fluid bearing as recited in claim 8, wherein said supply means comprises:

a pump in fluid communication with said at least one hydrostatic bearing pad.

* * * * *